US011778502B2

(12) United States Patent
Fan et al.

(10) Patent No.: US 11,778,502 B2
(45) Date of Patent: Oct. 3, 2023

(54) METHOD AND APPARATUS FOR PERFORMING WIRELESS COMMUNICATIONS

(71) Applicant: Nokia Technologies Oy, Espoo (FI)

(72) Inventors: Dongsheng Fan, Jiangsu (CN); Yigang Cai, Naperville, IL (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/055,185

(22) PCT Filed: May 18, 2018

(86) PCT No.: PCT/CN2018/087559
§ 371 (c)(1),
(2) Date: Nov. 13, 2020

(87) PCT Pub. No.: WO2019/218364
PCT Pub. Date: Nov. 21, 2019

(65) Prior Publication Data
US 2021/0204161 A1 Jul. 1, 2021

(51) Int. Cl.
*H04W 28/02* (2009.01)
*H04L 43/16* (2022.01)
*H04M 7/00* (2006.01)
*H04W 24/08* (2009.01)

(52) U.S. Cl.
CPC ......... *H04W 28/0263* (2013.01); *H04L 43/16* (2013.01); *H04M 7/0081* (2013.01); *H04W 24/08* (2013.01); *H04W 28/0215* (2013.01)

(58) Field of Classification Search
CPC ............. H04W 28/0263; H04W 24/08; H04W 28/0215; H04L 43/16; H04L 47/2416; H04M 7/0081
See application file for complete search history.

(56) References Cited

U.S. PATENT DOCUMENTS

| | | | |
|---|---|---|---|
| 2008/0186862 A1* | 8/2008 | Corbett | ................. H04W 72/52 370/237 |
| 2014/0010207 A1* | 1/2014 | Horn | ..................... H04W 36/22 370/332 |
| 2014/0189001 A1 | 7/2014 | Tyagi et al. | ................... 709/204 |

(Continued)

FOREIGN PATENT DOCUMENTS

| | | |
|---|---|---|
| CN | 102427598 A | 4/2012 |
| CN | 108024284 A | 5/2018 |

(Continued)

OTHER PUBLICATIONS

Bang, June-ho, et al., "Anomaly detection of network-initiated LTE signaling traffic in wireless sensor and actuator networks based on a Hidden semi-Markov Model", Elsevier, Computers & Security 65, Nov. 23, 2016, pp. 108-120.

*Primary Examiner* — Donald L Mills
(74) *Attorney, Agent, or Firm* — Harrington & Smith

(57) ABSTRACT

Configuration information is received for a first bearer for a first machine-type communication service type and a second bearer for at least one second machine-type communication service type, wherein the first service type includes a voice over internet protocol service. A base station communicates using said first bearer for said first service type and the second bearer for said at least one second service type.

19 Claims, 9 Drawing Sheets

(56) References Cited

U.S. PATENT DOCUMENTS

| | | | |
|---|---|---|---|
| 2016/0095034 A1* | 3/2016 | Hampel | H04W 36/14 370/331 |
| 2017/0237783 A1* | 8/2017 | Yang | H04W 36/08 370/331 |
| 2017/0359829 A1 | 12/2017 | Tabet et al. | 72/87 |
| 2018/0034604 A1* | 2/2018 | Rico Alvarino | H04W 72/121 |
| 2018/0077720 A1* | 3/2018 | Wang | H04W 72/1247 |
| 2018/0145839 A1* | 5/2018 | Lee | H04W 72/23 |
| 2018/0279409 A1* | 9/2018 | Balasu | H04W 72/1284 |
| 2019/0239097 A1* | 8/2019 | Meylan | H04L 1/1812 |

FOREIGN PATENT DOCUMENTS

| | | |
|---|---|---|
| JP | 2011223280 A | 11/2011 |
| JP | 2017220736 A | 12/2017 |
| JP | 2018011345 A | 1/2018 |
| KR | 10-2017-0134446 | 12/2017 |
| WO | WO 2013/101190 A1 | 7/2013 |
| WO | WO 2016/159731 A1 | 10/2016 |
| WO | WO-2017199789 A1 | 11/2017 |
| WO | WO-2016185758 A1 | 3/2018 |

* cited by examiner

METHOD AND APPARATUS FOR PERFORMING WIRELESS COMMUNICATIONS

CROSS REFERENCE TO RELATED APPLICATION

This patent application is a U.S. National Stage application of International Patent Application Number PCT/CN2018/087559 filed May 18, 2018, which is hereby incorporated by reference in its entirety.

TECHNICAL FIELD

This disclosure relates to communications, and more particularly to a method and apparatus in a wireless communication system.

BACKGROUND

A communication system can be seen as a facility that enables communication between two or more devices such as user terminals, machine-like terminals, base stations and/or other nodes by providing communication channels for carrying information between the communicating devices. A communication system can be provided for example by means of a communication network and one or more compatible communication devices.

A communication system and associated devices typically operate in accordance with a given standard or specification which sets out what the various entities associated with the system are permitted to do and how that should be achieved. Communication protocols and/or parameters which shall be used for the connection are also typically defined.

SUMMARY

According to a first aspect, there is provided a method, comprising: receiving configuration information for a first bearer for a first machine-type communication service type and a second bearer for at least one second machine-type communication service type, said first service type comprising a voice over internet protocol service; and communicating with a base station using said first bearer for said first service type and the second bearer for said at least one second service type.

In an example, the second bearer comprises a plurality of second machine-type communication service types.

In an example, a first narrowband supports the first bearer.

In an example, the first narrowband is a dedicated narrowband that can be used by only services of the first service type.

In an example, a second narrowband supports the second bearer.

In an example, the second narrowband is a shared narrowband that can be used by all machine-type communication service types.

In an example, the voice over internet protocol service is a voice over long term evolution service.

In an example, the method comprises receiving reconfiguration information providing a command to delete the first bearer for the first machine-type communication service type.

In an example, the reconfiguration information comprises a command to switch to the second narrow band.

In an example, one or more of the at least one second service type has a lower service priority than the first service type.

According to a second aspect, there is provided a method comprising:

transmitting, to an apparatus, configuration information for a first bearer for a first machine-type communication service type and a second bearer for at least one second machine-type communication service type, said first service type comprising a voice over internet protocol service; and communicating with the apparatus using said first bearer for said first service type and the second bearer for said at least one second service type.

In an example, the method comprises determining a metric of a signal quality for communications with the apparatus; comparing the metric to a threshold value and determining the configuration information in dependence on the comparison.

In an example, the method comprises determining the threshold value dynamically.

In an example, the method comprises determining a metric of a signal quality for communications with the apparatus and using the metric to determine a number of repetitions a channel transmitted to the apparatus is to have.

In an example, the method comprises receiving an indication of the signal quality from the apparatus and determining the metric from the indication.

In an example, the second bearer comprises a plurality of second machine-type communication service types.

In an example, a first narrowband supports the first bearer.

In an example, the first narrowband is a dedicated narrowband that can be used by only services of the first service type.

In an example, a second narrowband supports the second bearer.

In an example, the second narrowband is a shared narrowband that can be used by all machine-type communication service types.

In an example, the voice over internet protocol service is a voice over long term evolution service.

In an example, the method comprises receiving reconfiguration information providing a command to delete the first bearer for the first machine-type communication service type.

In an example, the reconfiguration information comprises a command to switch to the second narrow band.

In an example, one or more of the at least one second service type has a lower service priority than the first service type.

According to a third aspect, there is provided an apparatus comprising means for performing:

receiving configuration information for a first bearer for a first machine-type communication service type and a second bearer for at least one second machine-type communication service type, said first service type comprising a voice over internet protocol service; and communicating with a base station using said first bearer for said first service type and the second bearer for said at least one second service type.

In an example, the second bearer comprises a plurality of second machine-type communication service types.

In an example, a first narrowband supports the first bearer.

In an example, the first narrowband is a dedicated narrowband that can be used by only services of the first service type.

In an example, a second narrowband supports the second bearer.

In an example, the second narrowband is a shared narrowband that can be used by all machine-type communication service types.

In an example, the voice over internet protocol service is a voice over long term evolution service.

In an example, the apparatus comprises means for performing receiving reconfiguration information providing a command to delete the first bearer for the first machine-type communication service type.

In an example, the reconfiguration information comprises a command to switch to the second narrow band.

In an example, one or more of the at least one second service type has a lower service priority than the first service type.

According to a fourth aspect, there is provided an apparatus comprising means for performing:

transmitting, to an apparatus, configuration information for a first bearer for a first machine-type communication service type and a second bearer for at least one second machine-type communication service type, said first service type comprising a voice over internet protocol service; and communicating with the apparatus using said first bearer for said first service type and the second bearer for said at least one second service type.

In an example, the apparatus comprises means for performing, determining a metric of a signal quality for communications with the apparatus, comparing the metric to a threshold value and determining the configuration information in dependence on the comparison.

In an example, the apparatus comprises means for performing, determining the threshold value dynamically.

In an example, the apparatus comprises means for performing, determining a metric of a signal quality for communications with the apparatus and using the metric to determine a number of repetitions a channel transmitted to the apparatus is to have.

In an example, the apparatus comprises means for performing, receiving an indication of the signal quality from the apparatus and determining the metric from the indication.

In an example, the second bearer comprises a plurality of second machine-type communication service types.

In an example, a first narrowband supports the first bearer.

In an example, the first narrowband is a dedicated narrowband that can be used by only services of the first service type.

In an example, a second narrowband supports the second bearer.

In an example, the second narrowband is a shared narrowband that can be used by all machine-type communication service types.

In an example, the voice over internet protocol service is a voice over long term evolution service.

In an example, the apparatus comprises means for performing, receiving reconfiguration information providing a command to delete the first bearer for the first machine-type communication service type.

In an example, the reconfiguration information comprises a command to switch to the second narrow band.

In an example, one or more of the at least one second service type has a lower service priority than the first service type.

According to a fifth aspect, there is provided an apparatus comprising:

at least one processor;
at least one memory including computer program code;
wherein the at least one memory and computer program code is configured, with the at least one processor, to cause the apparatus at least to:

receive configuration information for a first bearer for a first machine-type communication service type and a second bearer for at least one second machine-type communication service type, said first service type comprising a voice over internet protocol service; and communicate with a base station using said first bearer for said first service type and the second bearer for said at least one second service type.

In an example, the second bearer comprises a plurality of second machine-type communication service types.

In an example, a first narrowband supports the first bearer.

In an example, the first narrowband is a dedicated narrowband that can be used by only services of the first service type.

In an example, a second narrowband supports the second bearer.

In an example, the second narrowband is a shared narrowband that can be used by all machine-type communication service types.

In an example, the voice over internet protocol service is a voice over long term evolution service.

In an example, the apparatus is caused to receive reconfiguration information providing a command to delete the first bearer for the first machine-type communication service type.

In an example, the reconfiguration information comprises a command to switch to the second narrow band.

In an example, one or more of the at least one second service type has a lower service priority than the first service type.

According to a sixth aspect, there is provided an apparatus comprising:

at least one processor;
at least one memory including computer program code;
wherein the at least one memory and computer program code is configured, with the at least one processor, to cause the apparatus at least to:

transmit, to an apparatus, configuration information for a first bearer for a first machine-type communication service type and a second bearer for at least one second machine-type communication service type, said first service type comprising a voice over internet protocol service; and communicate with the apparatus using said first bearer for said first service type and the second bearer for said at least one second service type.

In an example, the apparatus is caused to determine the threshold value dynamically.

In an example, the apparatus is caused to, determine a metric of a signal quality for communications with the apparatus and using the metric to determine a number of repetitions a channel transmitted to the apparatus is to have.

In an example, the apparatus is caused to receive an indication of the signal quality from the apparatus and determining the metric from the indication.

In an example, the second bearer comprises a plurality of second machine-type communication service types.

In an example, a first narrowband supports the first bearer.

In an example, the first narrowband is a dedicated narrowband that can be used by only services of the first service type.

In an example, a second narrowband supports the second bearer.

In an example, the second narrowband is a shared narrowband that can be used by all machine-type communication service types.

In an example, the voice over internet protocol service is a voice over long term evolution service.

In an example, the apparatus is caused to receive reconfiguration information providing a command to delete the first bearer for the first machine-type communication service type.

In an example, the reconfiguration information comprises a command to switch to the second narrow band.

In an example, one or more of the at least one second service type has a lower service priority than the first service type.

According to a seventh aspect, there is provided a computer program comprising code means adapted to, when the program is run on a processor, perform:

receiving configuration information for a first bearer for a first machine-type communication service type and a second bearer for at least one second machine-type communication service type, said first service type comprising a voice over internet protocol service; and communicating with a base station using said first bearer for said first service type and the second bearer for said at least one second service type.

In an example, the second bearer comprises a plurality of second machine-type communication service types.

In an example, a first narrowband supports the first bearer.

In an example, the first narrowband is a dedicated narrowband that can be used by only services of the first service type.

In an example, a second narrowband supports the second bearer.

In an example, the second narrowband is a shared narrowband that can be used by all machine-type communication service types.

In an example, the voice over internet protocol service is a voice over long term evolution service.

In an example, the code means is adapted to perform receiving reconfiguration information providing a command to delete the first bearer for the first machine-type communication service type.

In an example, the reconfiguration information comprises a command to switch to the second narrow band.

In an example, one or more of the at least one second service type has a lower service priority than the first service type.

According to an eighth aspect, there is provided a computer program comprising code means adapted to, when the program is run on a processor, perform:

transmitting, to an apparatus, configuration information for a first bearer for a first machine-type communication service type and a second bearer for at least one second machine-type communication service type, said first service type comprising a voice over internet protocol service; and communicating with the apparatus using said first bearer for said first service type and the second bearer for said at least one second service type.

In an example, the code means is adapted to perform determining a metric of a signal quality for communications with the apparatus; comparing the metric to a threshold value and determining the configuration information in dependence on the comparison.

In an example, the code means is adapted to perform determining the threshold value dynamically.

In an example, the code means is adapted to perform determining a metric of a signal quality for communications with the apparatus and using the metric to determine a number of repetitions a channel transmitted to the apparatus is to have.

In an example, the code means is adapted to perform receiving an indication of the signal quality from the apparatus and determining the metric from the indication.

In an example, the second bearer comprises a plurality of second machine-type communication service types.

In an example, a first narrowband supports the first bearer.

In an example, the first narrowband is a dedicated narrowband that can be used by only services of the first service type.

In an example, a second narrowband supports the second bearer.

In an example, the second narrowband is a shared narrowband that can be used by all machine-type communication service types.

In an example, the voice over internet protocol service is a voice over long term evolution service.

In an example, the code means is adapted to perform receiving reconfiguration information providing a command to delete the first bearer for the first machine-type communication service type.

In an example, the reconfiguration information comprises a command to switch to the second narrow band.

In an example, one or more of the at least one second service type has a lower service priority than the first service type.

In a ninth aspect there is provided a non-transitory computer-readable medium comprising instructions for causing an apparatus to perform a process comprising the steps of the method of the seventh or eighth aspect.

In a tenth aspect there is provided a computer-readable medium comprising instructions for causing an apparatus to perform at least a process comprising the steps of the method of the seventh or eighth aspect.

In the above, many different embodiments have been described. It should be appreciated that further embodiments may be provided by the combination of any two or more of the embodiments described above.

Various other aspects and further embodiments are also described in the following detailed description and in the attached claims.

BRIEF DESCRIPTION OF THE DRAWINGS

To assist understanding of the present disclosure and to show how some embodiments may be put into effect, reference is made by way of example only to the accompanying drawings in which.

DETAILED DESCRIPTION

Figure 1:
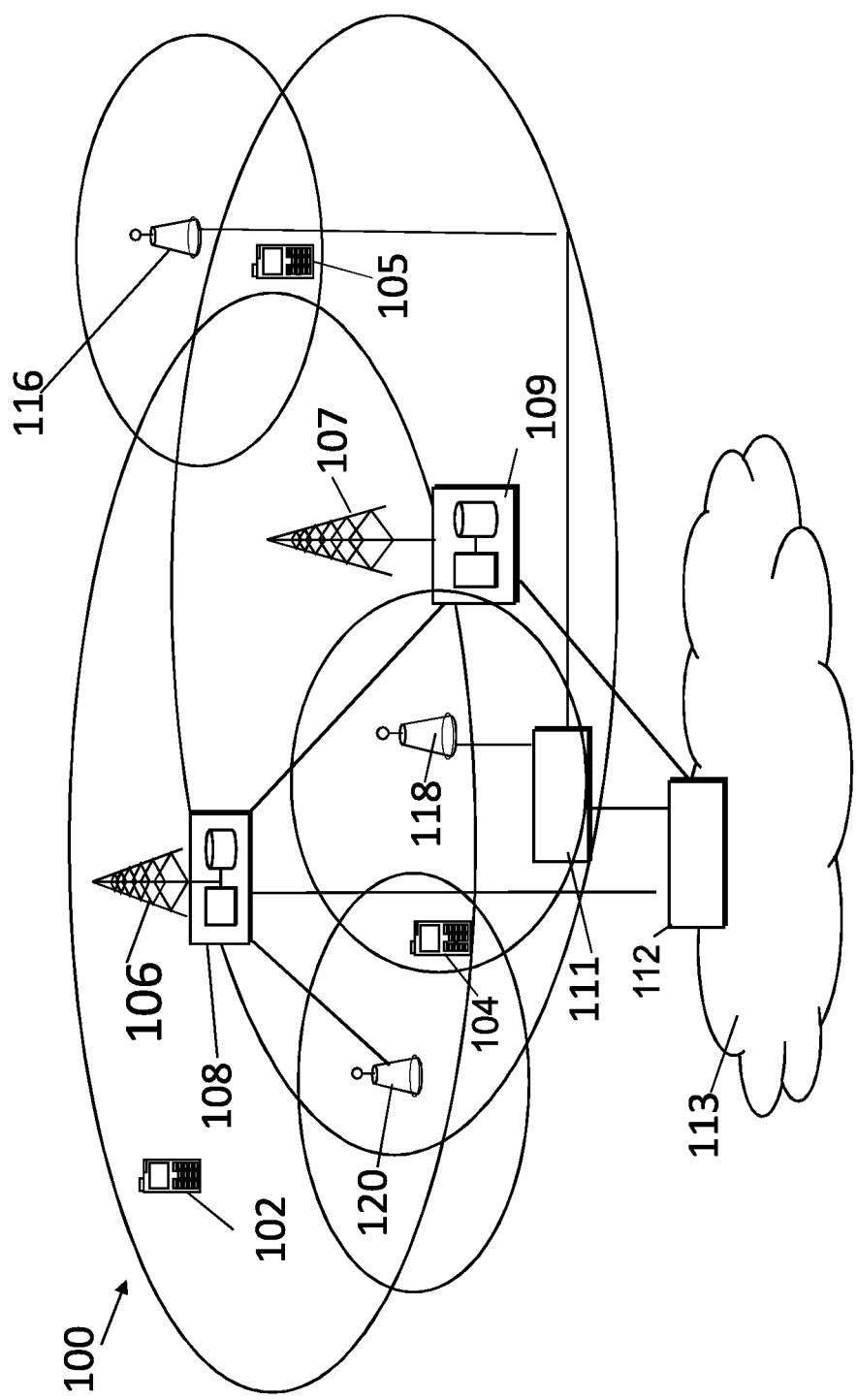
FIG. 1 shows schematically an example of a communications network.

Some embodiments may be provided in the context of machine type communication (MTC). It should be appreciated that other embodiments may be provided in different contexts, for example contexts where narrowband (NB) is used.

MTC equipment refers to a category of communication devices that perform machine-to-machine (M2M) communication. This may be without user intervention or manipulation. In some embodiments, one or more MTC devices can be used to sense and collect data by detecting and measuring information.

The so-call fifth generation (5G) or new radio (NR) standard has proposed enhanced machine type communication (eMTC) and narrowband internet-of-things (NB-IoT) to support internet of things (IoT) technology.

Some embodiments may relate to services such as voice over internet protocol (VoIP) services provided for devices performing machine type communication such as eMTC devices. In some examples, a VoIP service may be a voice over long term evolution (VoLTE) service. An eMTC device that may utilize VoLTE support may be, for example, a so-called "smart watch" or a patient health tracker.

For eMTC communications, a Bandwidth reduced Low Complexity (BL) technology may be used. With BL, an eMTC device may operate in any LTE system bandwidth but with a limited channel bandwidth of, for example, 6 continuous physical resource blocks (PRBs). In other examples, the continuous bandwidth may be another suitable amount of continuous PRBs for a narrowband (NB). In particular, the definition of a narrowband may be provided by an operating communication protocol. In an eMTC architecture, services may share a single NB. That narrowband may be one NB for uplink (UL) transmissions and one NB for downlink (DL) transmissions. Whether the NB for UL transmissions is the same NB used for DL may depends on eMTC frequency bands. The same NB may be used for UL and DL in other embodiments. In another example, the UL and DL use different NBs. Some of the examples shown may be applicable to any communications that are suitable with the use of NBs.

Different eMTC services may have different priority levels. One example of the priorities of eMTC services are shown in table 1, in descending order:

| Priority | Service |
| --- | --- |
| 0 | SIM transmission |
| 1 | Paging transmission |
| 2 | RACH-MSG4 HARQ re-transmission |
| 3 | RACH-MSG4 HARQ new-transmission |
| 4 | RACH-MSG3 HARQ re-transmission |
| 5 | RACH-MSG2 transmission |
| 6 | TA HARQ new re-transmission |
| 7 | TA HARQ new new-transmission |
| 8 | SRB and TRB (Non-GBR) HARQ re-transmission |
| 9 | SRB1 HARQ new transmission |
| 10 | SRB2 HARQ new transmission |
| 11 | Non-GBR TRB HARQ new-transmission |

The services shown in Table 1 are as follows: Subscriber Identity Module (SIM), Random Access Channel (RACH), message (MSG), hybrid automatic repeat request (HARM), timing advance (TA), signalling radio bearer (SRB), Non-Guaranteed Bit-rate (Non-GBR) and traffic radio bearer (TRB). This embodiment may result in a minimum legacy degradation. There may in some embodiments be only a limited eMTC capacity. There may for example be no priority for VoLTE in eMTC.

Some embodiments may provide VoLTE in the list of priorities. In Table 2 below, VoLTE has priority number 11 in the scheduling priority as shown below. In other examples, VoLTE may have a different priority number. In this example only, the VoLTE services are promoted in priority above Non-GBR services. Table 2, is in descending priority order:

| Priority | Service |
| --- | --- |
| 0 | SIM transmission |
| 1 | Paging transmission |
| 2 | RACH-MSG4 HARQ re-transmission |
| 3 | RACH-MSG4 HARQ new-transmission |
| 4 | RACH-MSG3 HARQ re-transmission |
| 5 | RACH-MSG2 transmission |
| 6 | TA HARQ new re-transmission |
| 7 | TA HARQ new new-transmission |
| 8 | SRB and TRB (Non-GBR and GBR) HARQ re-transmission |
| 9 | SRB1 HARQ new transmission |
| 10 | SRB2 HARQ new transmission |
| 11 | GBR(VoLTE) HARQ new-transmission |
| 12 | Non-GBR TRB HARQ new-transmission |

In the embodiment supported by Table 2, VoLTE shares a single NB with other services.

By way of example only, in Table 2 VoLTE has a higher priority than Non-GBR services, but VoLTE has a lower priority than common channels such as for example SIM, Paging, RACH, and HARQ re-transmissions.

The priority levels shown in Tables 1 and 2 are shown as examples only. The priority level of services may differ. Furthermore, there may be services for eMTC not shown in Table 1 or Table 2. In other embodiments, one or more of the services shown in the tables may alternatively or additionally be omitted.

If a higher priority service occupies a shared NB for a long time, it may delay VoLTE packet transmission. This may cause a VoLTE packet to be discarded by for example, an audio codec due to a time delay. The higher priority service may degrade the VoLTE service quality. For example, during a RACH procedure there may be a plurality of RACH and radio resource control (RRC) messages, which may require many repetitions to get coverage enhancements. During a heavy RACH period, a metric may fall outside an acceptable value or range. That metric may be a mean opinion score (MOS) of eMTC VoLTE and it may fall below, for example, a score of 3.0. This MOS score of 3.0 may not be acceptable according to some industry standards in some situations.

A single NB may only support a maximum number of bearers. As an example only, the number of bearers may be 5 VoLTE bearers simultaneously per NB. VoLTE may have periodical and frequent packets, which may be, for example, about two packets (one for UL, one for DL) per 20 ms. In the example of Table 2, Non-GBR services may have a lower priority than VoLTE services. Therefore in some situations, VoLTE scheduling may block Non-GBR traffic for a relatively long period, which may lead to a user equipment (UE) drop due to, for example, a radio link control (RLC) inactivity timer.

The priority for VoLTE services may not be hard coded, and/or may not be set via operator controls. Both VoLTE in eMTC and legacy capacity and performance may need to be manageable statically and/or dynamically by for example network operators.

In some embodiments, VoLTE services and other services may be controlled by dynamic thresholds. This may be by intelligent controls. This may guarantee or improve VoLTE quality and/or increase VoLTE capability.

A wireless communication system and communication devices may be used when providing some embodiments and are briefly explained with reference to FIGS. 1, 2 and 3 to assist in understanding the technology underlying the described examples.

In a wireless communication system 100, such as that shown in FIG. 1, wireless communication devices, for example, user equipment (UE) or MTC devices 102, 104, 105 are provided wireless access via at least one base station or similar wireless transmitting and/or receiving wireless infrastructure access node or point. Such an access node can be, for example, a base station or an eNodeB (eNB), or in a 5G system a Next Generation NodeB (gNB), or other wireless infrastructure node. These nodes will be generally referred to as base stations. Base stations may be controlled by at least one appropriate controller apparatus provided in the base stations, so as to enable operation thereof and management of communication devices in communication with the base stations.

FIG. 1 shows schematically the control apparatus 108 and 109 of respective macro level base stations 106 and 107.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the controller apparatus 108. In some embodiments, the smaller stations may not be provided.

Figure 2:
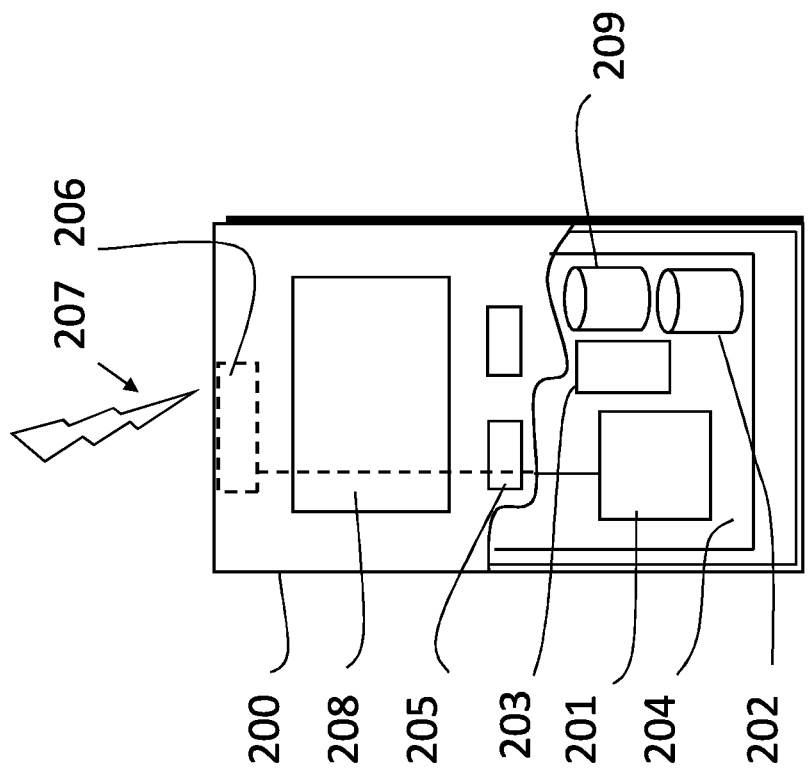
FIG. 2 shows schematically an example of communication device.

A wireless communication device of some embodiments will now be described in more detail with reference to FIG. 2 showing a schematic, partially sectioned view of a communication device 200. Such a communication device is often referred to as an MTC device, eMTC device, user equipment (UE) or terminal. An appropriate mobile communication device may be provided by any device capable of sending and receiving radio signals.

A wireless communication device may be for example a mobile device, that is, a device not fixed to a particular location, or it may be a stationary device. The wireless device may need human interaction for communication, or may not need human interaction for communication, for example being an MTC device.

The wireless device 200 may receive signals over an air or radio interface 207 via appropriate apparatus for receiving and may transmit signals via appropriate apparatus for transmitting radio signals. In FIG. 2 a transceiver apparatus is designated schematically by block 206. The transceiver apparatus 206 may be provided for example by means of a radio part and associated antenna arrangement. The antenna arrangement may be arranged internally or externally to the wireless device.

A wireless communication device may comprise at least one data processing entity 201, at least one random access memory 202, at least one read only memory 209, and other possible components 203 for use in software and hardware aided execution of tasks it is designed to perform, including control of access to and communications with access systems and other communication devices. The at least one random access memory 202 and the at least one read only memory 209 may be in communication with the data processing entity 201, which may be a data processor. The data processing, storage and other relevant control apparatus can be provided on an appropriate circuit board and/or in chipsets. This feature is denoted by reference 204. The wireless device may optionally comprise a user interface such as key pad 205, voice commands, touch sensitive screen or pad, combinations thereof or the like. One or more of a display 208, a speaker and a microphone may optionally be provided. Furthermore, a wireless communication device may comprise appropriate connectors (either wired or wireless) to other devices and/or for connecting external accessories, for example hands-free equipment, thereto.

Figure 3:
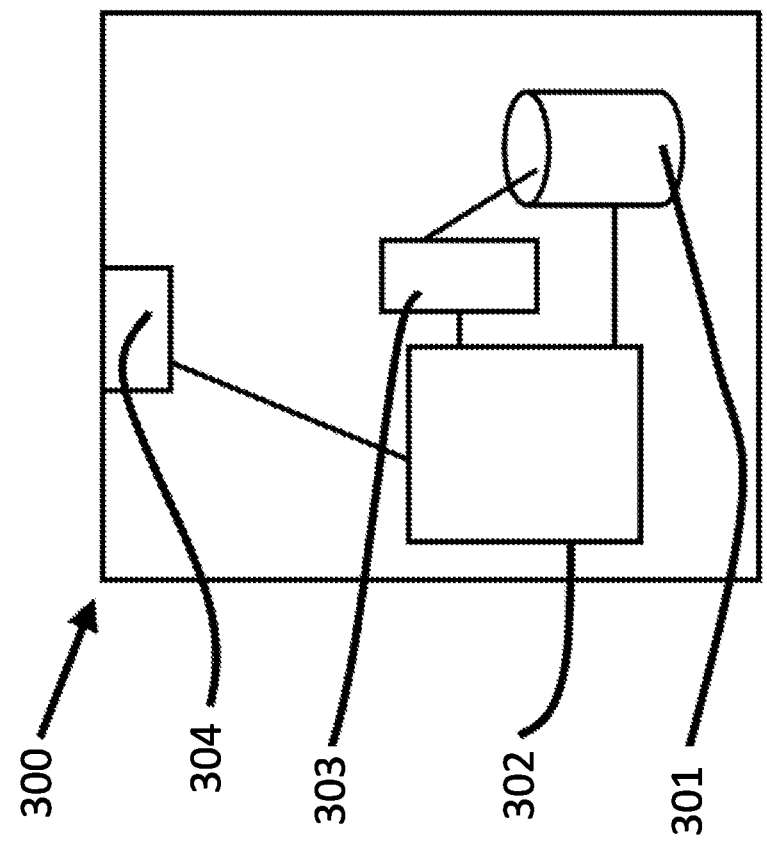
FIG. 3 shows schematically an example of a control apparatus.

An example control apparatus 300 is shown in FIG. 3. The control apparatus may be provided in a base station. As an example only, a scheduler may be provided by the control apparatus 300. In some examples, an eMTC scheduler may be provided by the control apparatus 300. In some examples, a non-eMTC scheduler may be provided by the control apparatus 300. In some examples, an RRC entity may be provided by the control apparatus 300.

The apparatus 300 comprises at least one memory 301, at least one data processing unit 302, 303 and an input/output interface 304. The apparatus 300 or processor 302/303 can be configured to execute an appropriate software code to provide control functions. The processors 302, 303 may perform functions associated with the operation of apparatus 300.

In certain examples, the at least one memory 301 stores software modules that provide functionality when executed by the processors 302, 303. The modules may include an operating system that provides operating system functionality for apparatus 300. The components of apparatus 300 may be implemented in hardware, or as any suitable combination of hardware and software.

Figure 4:
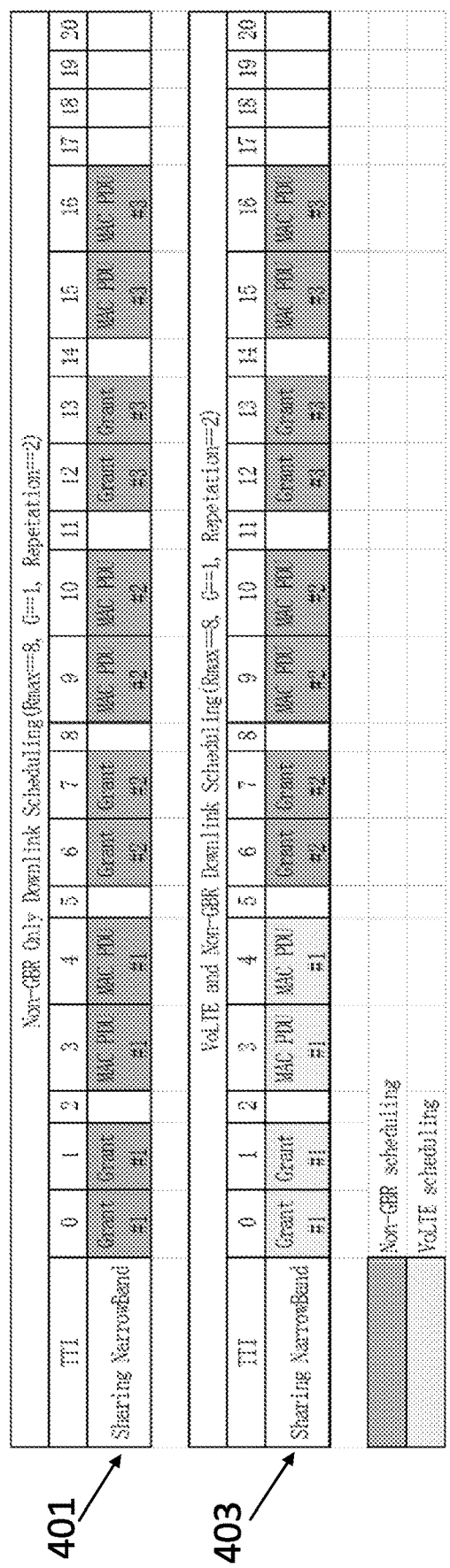
FIG. 4 shows schematically first and second scheduling scenarios.

FIG. 4 shows an example of where VoLTE scheduling might degrade Non-GBR traffic. This uses the priority of Table 2. VoLTE has a higher priority level than Non-GBR services in this example. Therefore, the addition of VoLTE services may delay the Non-GBR services in some situations.

A first scenario 401 shows an example with Non-GBR services only being scheduled in downlink. In transmission time intervals (TTIs) 0 and 1 there is a first Non-GBR bearer grant, in TTIs 6 and 7 there is a second Non-GBR bearer grant and in TTIs 12 and 13 there is a third Non-GBR bearer grant.

In transmission time intervals (TTIs) 3 and 4 there are Medium Access Control (MAC) Protocol Data Units (PDUs) being passed down to the physical layer for the first bearer, in TTIs 9 and 10 there are MAC PDUs being passed down to the physical layer for the second bearer and in TTIs 15 and 16 there are MAC PDUs being passed down to the physical layer for the third bearer.

A second scenario 403 shows an example whereby VoLTE and Non-GBR services are both being scheduled in the downlink. In TTIs 0 and 1 there is a first VoLTE bearer grant followed by MAC PDUs for the first VoLTE bearer being passed down to the physical layer in TTIs 3 and 4. In transmission time intervals (TTIs) 6 and 7 there is a first Non-GBR bearer grant and in TTIs 12 and 13 there is a second Non-GBR bearer grant. In TTIs 9 and 10 there are MAC PDUs being passed down to the physical layer for the first Non-GBR bearer and in TTIs 15 and 16 there are MAC PDUs being passed down to the physical layer for the second Non-GBR bearer.

From the second scenario 403, the Non-GBR scheduling may be delayed until after the first VoLTE bearer setup. In another example, if two or VoLTE bearers are setup then Non-GBR scheduling may be blocked for even longer.

In both the first scenario 401 and the second scenario 403 in TTIs 2, 5, 11 and 14 there is no transmission. The transmissions shown in the first scenario 401 and the second scenario 403 are shown as an example only and the transmission pattern may vary.

In some embodiments of the present disclosure, an eMTC scheduler requests a dedicated NB from a legacy/non-eMTC scheduler when a first eMTC VoLTE bearer is setup. In some examples, the eMTC scheduler and the legacy/non-eMTC are software modules. In some examples, the eMTC scheduler and the legacy/non-eMTC scheduler are provided in one or more base stations. The eMTC scheduler and legacy/non-eMTC scheduler may be provided in separate base stations. The eMTC scheduler and legacy/non-eMTC scheduler be may be provided by different parts of a single scheduler.

If the non-eMTC scheduler rejects the eMTC scheduler's request, then the VoLTE service may have to share a single NB with other non-VoLTE services as shown in the second scenario of FIG. 4. In this case, the VoLTE scheduling may be delayed by a higher priority service, such as a common channel or the RACH (see priorities in the example of Table 2). However, VoLTE scheduling may delay a Non-GBR HARQ transmission.

If the non-eMTC scheduler approves this eMTC scheduling request, then all the VoLTE service may be scheduled in the dedicated NB. Only VoLTE service may use the dedicated NB in some embodiments. The eMTC scheduler may only release the dedicated NB to other services such as the non-eMTC services when the last eMTC VoLTE bearer is released. In some embodiments, this may mean that the VoLTE scheduling may not be delayed by other services, and VoLTE scheduling may not block Non-GBR traffic.

Figure 5:
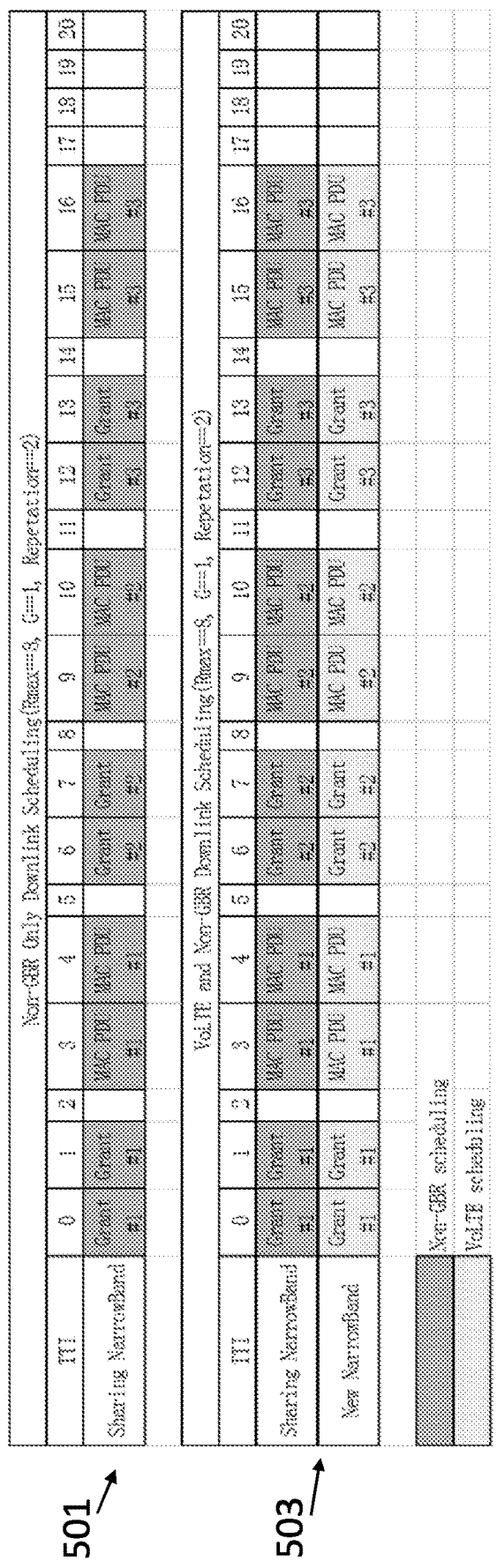
FIG. 5 shows schematically third and fourth scheduling scenarios.

FIG. 5 shows an example of a dedicated NB for VoLTE scheduling of some embodiments. A third scenario 501 is the same as the first scenario 401 as shown in FIG. 4. As seen in the third scenario 501, if there are only Non-GBR services being scheduled then there will only be Non-GBR services scheduled in the shared NB. In other examples, other non-VoLTE services may also be scheduled in the shared NB.

A fourth scenario 503 shows an example whereby there is VoLTE services and Non-GBR services being scheduled. However, in a difference to the second scenario 403, in the fourth scenario 503 the non-eMTC scheduler has approved an eMTC scheduling request for a dedicated NB for VoLTE services. Therefore, as seen in the fourth scenario 503 of FIG. 4 the Non-GBR services are being scheduled on the shared NB while the VoLTE services are being scheduled on the new NB.

In the examples shown in FIGS. 4 and 5, the transmission repetition is set to 2 which is why the MAC PDUs for each bearer are found in two adjacent TTIs. In other examples the repetition may be set to 4, 8 or any other suitable number. The repetition value may be set according to channel quality measurements as will be explained in more detail further on.

In some embodiments, the dedicated NB for VoLTE services may be such that the VoLTE scheduling has no or a reduced impact on the Non-GBR traffic.

Figure 6:
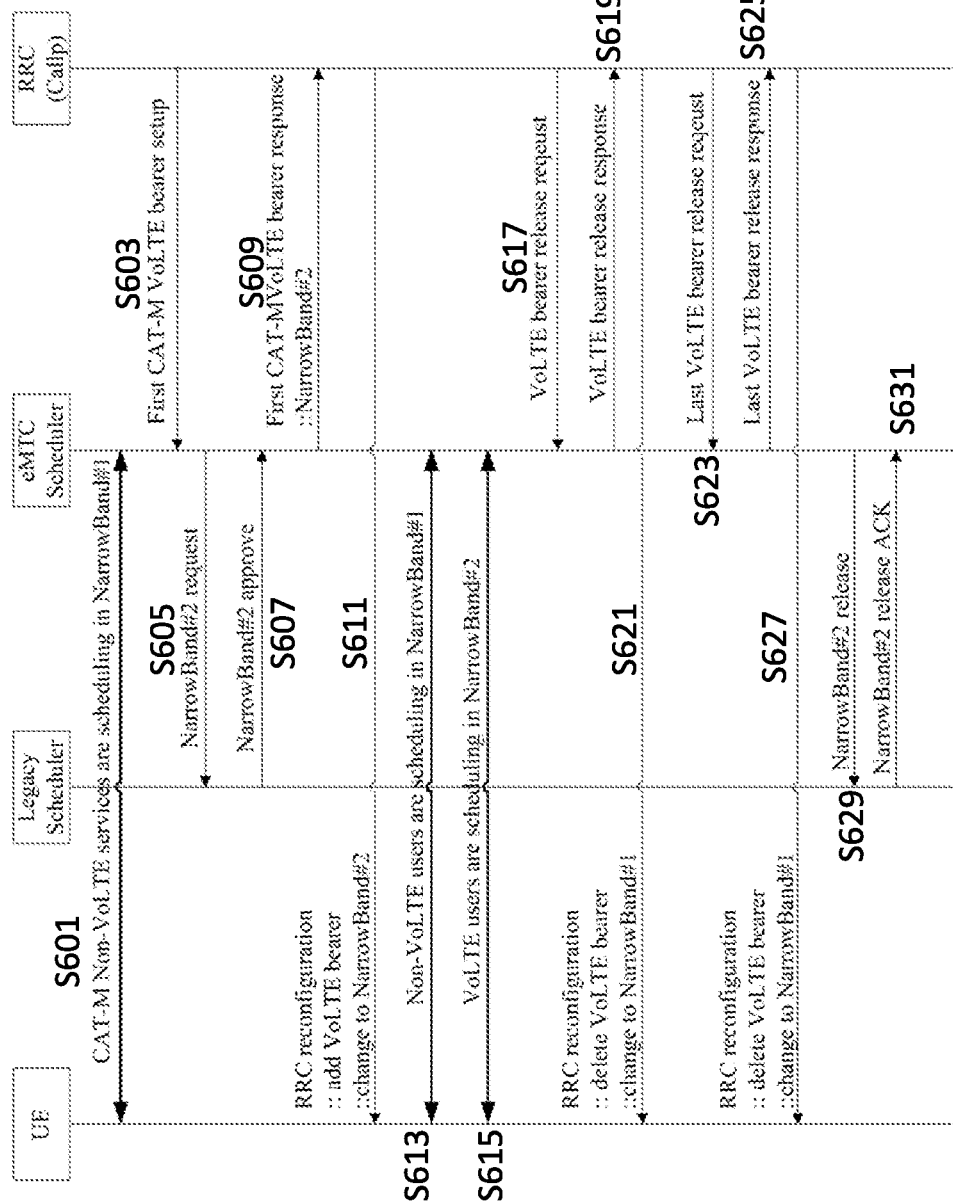
FIG. 6 shows a first method flow.

FIG. 6 shows an example of signalling that may occur between a UE, a non-eMTC scheduler, an eMTC scheduler and an RRC (call processing) entity when configuring a new NB for VoLTE services. The eMTC scheduler may be provided by a software module in a base station in embodiments. The eMTC scheduler may be provided in a control apparatus 300 as shown in FIG. 3. The non-eMTC scheduler may be provided by a software module in a base station in embodiments. The non-eMTC scheduler may be provided in a control apparatus 300 as shown in FIG. 3. The RRC entity may be provided by a software module in a base station in embodiments. The RRC entity may be provided in a control apparatus 300 as shown in FIG. 3.

At step 601, category-M (CAT-M) Non-VoLTE services are scheduled in NB #1. NB #1 may be a shared NB. A CAT-M service is a type of service that may include an eMTC service (other MTC services may also be included). A CAT-M service is a service that has been optimised towards low power communications. It is understood that the presently described techniques are not limited to CAT-M services. The UE may have to have received an RRC connection configuration message from the RRC entity establishing a bearer for a non-VoLTE service in the shared NB (not shown). In response to receiving the RRC connection configuration message, the UE may establish a bearer for a non-VoLTE service in the shared NB.

At step 603, the RRC entity initiates a first CAT-M VoLTE bearer setup with the eMTC scheduler. In other examples, the eMTC scheduler may be a CAT-M scheduler.

At step 605, the eMTC scheduler transmits a NB #2 request to the non-eMTC scheduler. The NB #2 may be a dedicated NB for use only by VoLTE services. In other examples, the dedicated NB may be for use only by a different eMTC service. When the non-eMTC scheduler receives a dedicated NB request from the eMTC, the non-eMTC scheduler checks the non-eMTC traffic load. If the non-eMTC traffic load is higher than a high threshold, then it means that the non-eMTC scheduler may be busy. Therefore, in this case, the non-eMTC scheduler may reject this request for a dedicated NB. If non-eMTC traffic load is lower than a low threshold, then it means the non-eMTC scheduler may be free. In this case, the non-eMTC scheduler may approve this request for a dedicated NB, and mask the NB physical resource blocks (PRBs) as unavailable for scheduling.

In embodiments, one or both of static and dynamical thresholds may be introduced for control of the dedicated NB for VoLTE.

Static thresholds may be configured with one or both low and high thresholds, One or both of the thresholds may be determined based on, for example, expected network conditions. The thresholds may be configurable by a network operator. In examples, there may be stepped static thresholds set by an operator.

Dynamical thresholds may be configured with one or more of an initial low and high threshold. In some embodiments, but the actual threshold values may be dynamically adjusted. The one or more threshold values may be adjusted by a network operator or by a base station. In some embodiments, the one or more threshold values may be adjusted according to pre-defined scenarios and/or one or more parameters. The one or more parameters may be, for example, signal strength, UE power levels, radio traffics, service quality, service urgency, etc. The network operator and/or base station may set up incremental steps of increase or decrease of one or both of the dynamic thresholds. Network operators may pre-configure whether static and/or dynamic thresholds are to be utilized in scheduling. Network operators may switch between static and dynamic thresholds during scheduling according to changes in network conditions.

At step 607, the non-eMTC scheduler transmits an NB #2 approval message to the eMTC scheduler.

At step 609, the eMTC scheduler transmits a first CAT-M VoLTE bearer response message to the RRC entity. The response message may indicate the dedicated NB for use by the VoLTE services.

At step 611, an RRC connection reconfiguration message is transmitted from the RRC entity to the UE. An RRC connection reconfiguration message is used an example only and in other examples another suitable message may be transmitted to the UE. The RRC message provides a command to modify an RRC connection to establish a VoLTE bearer and to change to NB #2 for VoLTE services. In response to receiving the RRC connection configuration message the UE may establish a VoLTE bearer and to change to NB #2 for VoLTE services.

Before the UE sets up the VoLTE bearer, all services are scheduled on the shared NB. When the UE sets up the VoLTE bearer, the RRC reconfiguration message will notify the UE to add the VoLTE bearer and switch to NB #2 for VoLTE scheduling. The eMTC scheduler will only request a VoLTE NB when the first VoLTE bearer sets up. After the dedicated NB #2 is established, all VoLTE users will be scheduled on the VoLTE NB #2.

At step 613 it can be seen that the Non-VoLTE services are scheduled in the shared NB #1. At step 615 it can be seen that the VoLTE services are scheduled in the dedicated NB #2. NB #2 is exclusively for VoLTE users. Therefore, in this situation there may be first bearer that schedules VoLTE services only in the dedicated NB #2 and a second bearer that schedules all other eMTC services in the shared NB #1. In other examples, there may be a plurality of bearers per NB. In some embodiments, Non-VoLTE services may be scheduled in the shared NB #1 while simultaneously VoLTE services may be scheduled in the dedicated NB #2. In other examples, the scheduling may not be simultaneous and there may be a scheduling offset for example.

At step 617, the RRC entity transmits a VoLTE bearer release request to the eMTC scheduler.

At step 619, the eMTC scheduler transmits a VoLTE bearer release response to the RRC entity.

At step 621, an RRC connection reconfiguration message is transmitted from the RRC entity to the UE. The RRC message provides a command to modify an RRC connection, to delete the VoLTE bearer and to change to the shared NB #1 for VoLTE services. In response to receiving the RRC connection configuration message the UE may delete the VoLTE bearer and to change to shared NB #1 for VoLTE services.

At step 623, the RRC entity transmits a last VoLTE bearer release request to the eMTC scheduler.

At step 625, the eMTC scheduler transmits a last VoLTE bearer release response to the RRC entity.

At step 627, an RRC connection reconfiguration message is transmitted from the RRC to the UE. The RRC connection reconfiguration message provides a command to modify an RRC connection, the command instructing the UE to delete the last VoLTE bearer and to change to the shared NB #1 for VoLTE services. In response to receiving the RRC connection configuration message the UE may delete the last VoLTE bearer and change to shared NB #1 for VoLTE services.

At step 629, the eMTC scheduler transmits a NB #2 release message to the non-eMTC scheduler.

At step 631, the non-eMTC scheduler transmits a NB #2 release acknowledgement message to the eMTC scheduler. The eMTC scheduler releases the VoLTE NB only when the last VoLTE bearer is deleted.

The example shown in FIG. 6 shows the setup of only one VoLTE bearer. In other examples, one or more VoLTE bearers may be set up for NB #2. Furthermore, FIG. 6 shows the use of RRC connection reconfiguration messages for communication with the UE. In other examples, messages from another suitable communication protocol can be used.

Figure 7:
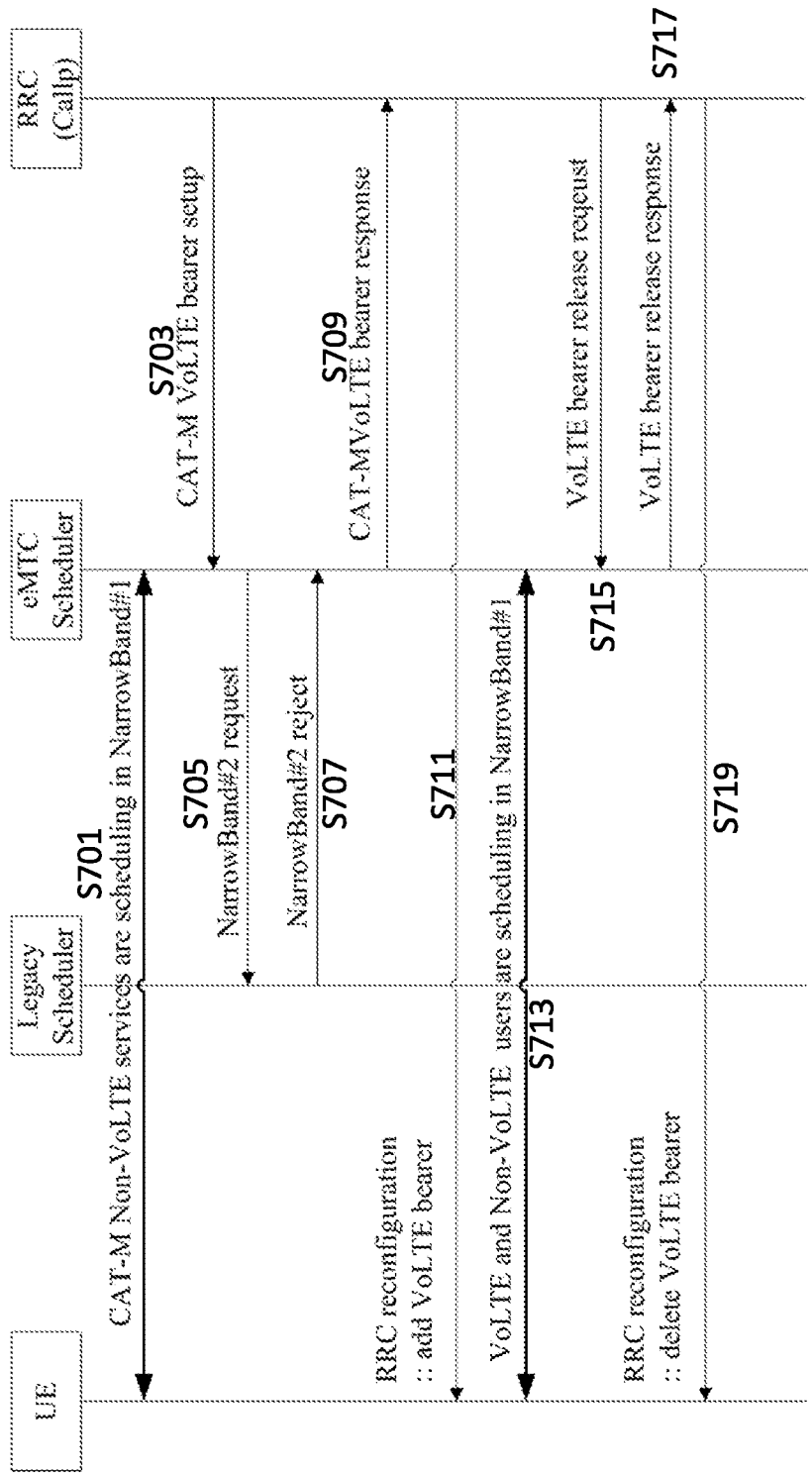
FIG. 7 shows a second method flow.

FIG. 7 shows an example of signalling that may occur between a UE, a non-eMTC scheduler, an eMTC scheduler and an RRC (call processing) entity when a request for a dedicated NB for VoLTE services is rejected by a non-eMTC scheduler. As discussed previously, a non-eMTC scheduler may reject a request for a new NB if non-eMTC traffic is above a high threshold.

At step 701, CAT-M Non-VoLTE services may be scheduled in NB #1. NB #1 may be a shared NB.

At step 703, the RRC entity initiates a CAT-M VoLTE bearer setup with the eMTC scheduler.

At step 705, the eMTC transmits a NB #2 request to the non-eMTC scheduler. The NB #2 may be a dedicated NB for use only by VoLTE services. In other examples the dedicated NB may be used only by another eMTC service. When the non-eMTC scheduler receives a dedicated NB request from the eMTC, the non-eMTC scheduler checks the non-eMTC traffic load. If the non-eMTC traffic load is higher than a high threshold, then it means non-eMTC scheduler is busy. Therefore, in this case, the non-eMTC scheduler will reject this request for a new dedicated NB. If non-eMTC traffic load is lower than a low threshold, then it means the non-eMTC scheduler is free. In this case, the non-eMTC scheduler will approve this request.

At step 707, the non-eMTC scheduler may have detected that the non-eMTC traffic is above a high threshold and therefore transmits a NB #2 reject message to the eMTC scheduler. In other examples, the non-eMTC scheduler rejects the request for NB #2 for another reason.

At step 709, the eMTC scheduler transmits a first CAT-M VoLTE bearer response message to the RRC entity.

At step 711, an RRC connection reconfiguration message is transmitted from the RRC entity to the UE. In step 709 the RRC entity did not receive any information regarding a dedicated NB for VoLTE services. Therefore, the RRC message of step 711 provides a command to modify an RRC connection, the command instructing the UE to establish a VoLTE bearer and to use NB #1 for VoLTE service scheduling. There is no command within the message to switch to NB #2 for VoLTE services as this request was rejected by the non-eMTC scheduler. In response to receiving the RRC connection configuration message the UE may establish a VoLTE bearer for use in the NB #1.

At step 713, VoLTE and Non-VoLTE users are scheduled in shared NB #1.

At step 715, the RRC entity transmits a VoLTE bearer release request to the eMTC scheduler.

At step 717, the eMTC scheduler transmits a VoLTE bearer release response to the RRC.

At step 719, an RRC connection reconfiguration message is transmitted from the RRC entity to the UE. The RRC message provides a command to modify an RRC connection, the command instructing the UE to delete the VoLTE bearer. In response to receiving the RRC connection configuration message the UE may delete the VoLTE bearer.

Figure 8:
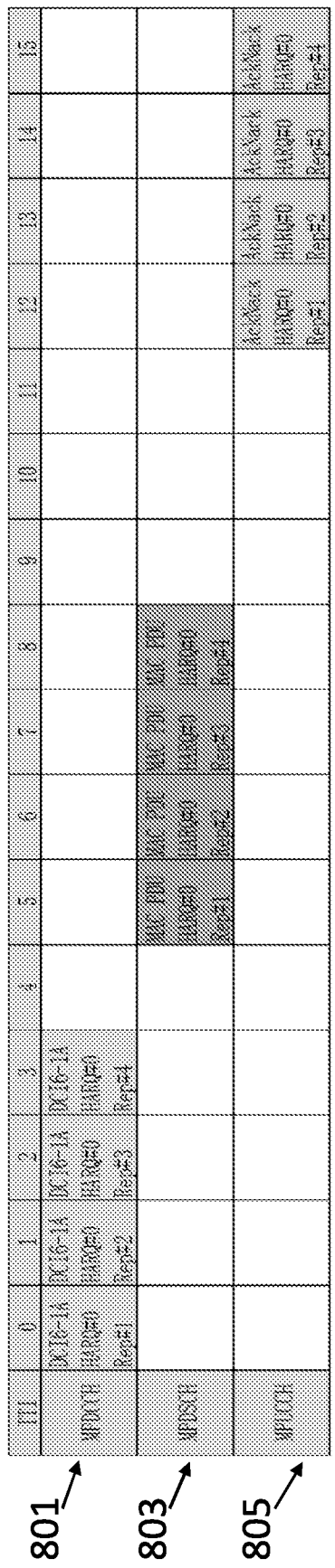
FIG. 8 shows schematically HARQ repetition for various channels.

FIG. 8 shows an example of downlink HARQ transmissions with 4 repetitions for each of the MTC physical downlink control channel (MPDCCH) 801, the MTC physical downlink shared channel (MPDSCH) 803 and the MTC physical uplink control channel (MPUCCH) 805. The repetition number of 4 shown in FIG. 8 is an example only and any suitable repetition number may be used. Repetition of transmissions may result in coverage enhancements for machine type communications. The repetition number for uplink and downlink channels may be configured using, for example, customer or network operator parameters.

For BL communications such as for example, machine type communications, particular downlink control information (DCI) formats are used. An example of a particular DCI format is DCI6-1A. Format 6-1A may be used to schedule PDSCH or to schedule a random access procedure initiated by a PDCCH Order.

In the example seen in FIG. 8, the MPDCCH 801 transmits DCI6-1A in TTI 0. This transmission is repeated in TTIs 1, 2 and 3. There is no transmission in any channels in TTI 4. The MPDSCH 803 transmits a MAC PDU in TTI 5. This transmission is repeated in TTIs 6, 7 and 8. There is no transmission in any channels in TTIs 9, 10 or 11. The MPUCCH 805 transmits an ACK/NACK in TTI 12. This transmission is repeated in TTIs 13, 14 and 15.

Repetition of transmissions may introduce signal-to-interference-plus-noise ratio (SINR) gain (for example, 3 dB for 2 repetitions, 6 dB for 4 repetitions, and 9 dB for 8 repetitions, and so on). Repetitions may reduce the complexity of decoding the transmissions. However, the repetitions may occupy more time and frequency resources.

If an eMTC device is near a cell, then the eMTC device may not need many repetitions in order to successfully decode a transmission that may be sent from the cell to the UE. For this case, a base station (eNB/gNB) may be able to decrease repetitions in order to save UE power and to increase cell capacity.

The base station may adjust the repetition number of downlink channels with a SINR derived from a channel quality indicator (CQI) reported by the UE. The base station may adjust the repetition number of uplink channels with a SINR derived from a demodulation reference signal (DMRS). Network operators may utilize a repetition adjustment algorithm in order to decrease the repetition number for users that have good radio frequency conditions. This adjustment algorithm may be utilized for all eMTC users for a variety of different service and not only for VoLTE users.

Table 3 shows an example lookup table for SINR thresholds for downlink transmissions and Table 4 shows an example lookup table for SINR thresholds for uplink transmissions. The values shown in Table 3 and 4 are example values only and can be configured to any appropriate number. The metric SINR is used in Tables 3 and 4, but in other examples, different metrics can be used such as SNR. A base station may compare a measured SINR with the items in the table in order to select a repetition number for machine type communication transmissions.

TABLE 3

| SINR threshold for DOWNLINK (in dB) | Repetition number |
|---|---|
| 10 | 1 |
| 8 | 2 |
| 5 | 4 |
| 3 | 8 |

TABLE 4

| SINR threshold for UPLINK (in dB) | Repetition number |
|---|---|
| 9 | 1 |
| 7.5 | 2 |
| 4 | 4 |
| 2 | 8 |

For example, if the measured SINR is larger than or equal to 10 dB, the downlink channels may use 1 repetition. If the measured SINR is smaller than 3 dB, then the downlink channels may use 8 repetitions. Table 3 and Table 4 show separate tables for uplink and downlink. In other example a single lookup table is used for both DL and UL channels. The thresholds shown in Table 3 and Table 4 are by way of example only and may vary in other embodiments.

Figure 9:
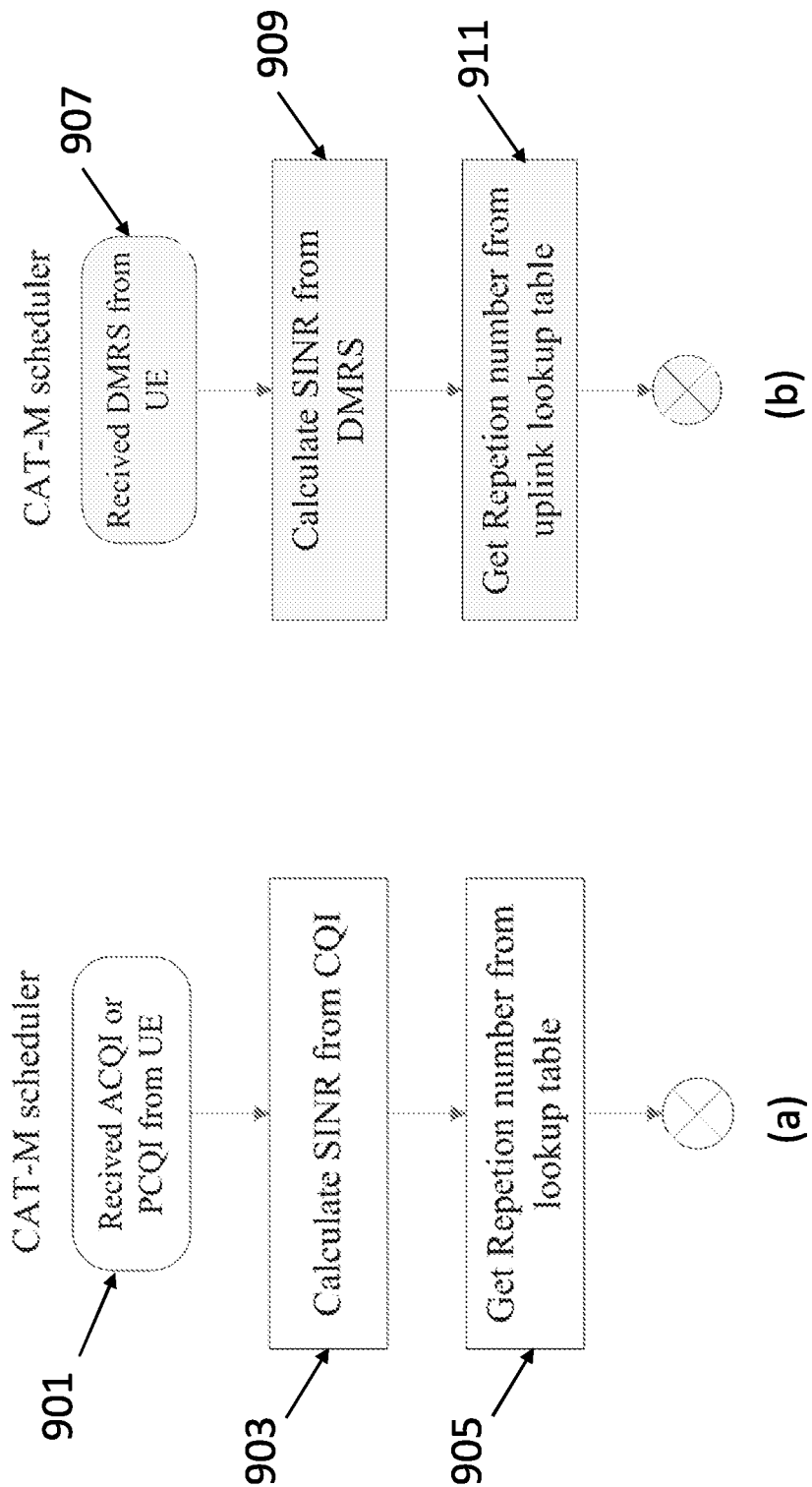
FIG. 9a shows schematically a method for repetition selection for downlink.
FIG. 9b shows schematically a method for repetition selection for uplink.

FIG. 9a shows an example of a repetition selection algorithm used for downlink channels. At step 901 a CAT-M/eMTC scheduler will receive one or more channel quality indicator(s) (CQI) from a UE. The CAT-M/eMTC scheduler may be provided in a base station. The CQI may be the acquired CQI (ACQI), whereby a base station requests a UE to report CQI, or it may be periodical CQI (PCQI) whereby a UE is configured to report CQI to a base station periodically. At step 903 the CAT-M scheduler will calculate a SINR using the received CQI. At step 905 the CAT-M scheduler will retrieve the appropriate repetition number for downlink from a lookup table, such as Table 3, dependent on the calculated SINR.

FIG. 9b shows an example of a repetition selection algorithm used for uplink channels. At step 907 the CAT-M/eMTC scheduler will receive one or more DMRS(s) from the UE. At step 909 the CAT-M scheduler will calculate a SINR from the received one or more DMRS(s). At step 911 the CAT-M scheduler will retrieve the correct repetition number for uplink from a lookup table, such as Table 4, dependent on the calculated SINR.

The repetition number can be selected by the CAT-M/eMTC scheduler or non-eMTC scheduler at any time after a CQI/DMRS is received from a UE.

Using the above disclosed repetition procedures this can increase VoLTE in eMTC capacity. This may improve key performance indicators (KPI).

In general, the various examples shown may be implemented in hardware or in special purpose circuits, software, logic or any combination thereof. Some aspects may be implemented in hardware, while other aspects may be implemented in firmware or software which may be executed by a controller, microprocessor or other computing device, although the invention is not limited thereto. While various aspects may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Some embodiments may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out methods are described in the present disclosure. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Examples of the disclosed embodiments may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the invention, which is defined in the claims.

What is claimed is:

1. A method, comprising:
   receiving, by an apparatus of a communication network, configuration information for a first bearer for a first machine-type communication service type and a second bearer for at least one second machine-type communication service type of a plurality of machine-type communication service types;
   wherein each of the plurality of machine-type communication service types is associated with a priority level of at least one priority level from the communication network,
   wherein the at least one priority level is based on an identified at least one of a narrowband occupancy by a machine-type communication service type, a maximum number of machine-type communication bearers, or a blockage of non-guaranteed bit rate traffic by a machine-type communication service type, and
   wherein a second machine-type communication service type is associated with a priority level that is promoted higher than a non-guaranteed bearer of the first machine-type communication service type, said first machine-type communication service type comprising a voice over internet protocol service,
   wherein based on the first machine-type communication service type and the second machine-type communication service type occupying a same narrowband, and a duration of the higher priority of the second machine-type communication service type exceeding a predetermined time, discarding at least one packet of the first machine-type communication service type; and
   communicating with a base station with the voice over internet protocol service based on the priority level using said first bearer for said first machine-type communication service type and the second bearer for said at least one second machine-type communication service type.

2. A method comprising:
   transmitting, to an apparatus of a communication network, configuration information for a first bearer for a first machine-type communication service type and a second bearer for at least one second machine-type communication service type of a plurality of machine-type communication service types;
   wherein each of the plurality of machine-type communication service types is associated with a priority level of at least one priority level from the communication network,
   wherein the at least one priority level is based on an identified at least one of a narrowband occupancy by a machine-type communication service type, a maximum number of machine-type communication bearers, or a blockage of non-guaranteed bit rate traffic by a machine-type communication service type, and
   wherein a second machine-type communication service type is associated with a priority level that is promoted higher than a non-guaranteed bearer of the first machine-type communication service type, said first machine-type communication service type comprising a voice over internet protocol service,
   wherein based on the first machine-type communication service type and the second machine-type communication service type occupying a same narrowband, and a duration of the higher priority of the second machine-type communication service type exceeding a predetermined time, discarding at least one packet of the first machine-type communication service type; and
   communicating with the apparatus using said first bearer for said first machine-type communication service type and the second bearer for said at least one second machine-type communication service type.

3. The method as claimed in claim 2, comprising:
   determining a metric of a signal quality for communications with the apparatus;
   comparing the metric to a threshold value, wherein the threshold value is determined dynamically; and
   determining the configuration information in dependence on the comparison.

4. The method as claimed in claim 2, wherein the configuration comprises scheduling of the non-guaranteed bearer is delayed until after the first bearer is setup.

5. The method as claimed in claim 2, comprising:
   determining a metric of a signal quality for communications with the apparatus; and
   using the metric to determine a number of repetitions a channel transmitted to the apparatus is to have.

6. The method as claimed in claim 3, comprising:
receiving an indication of the signal quality from the apparatus; and
determining the metric from the indication.

7. The method as claimed in claim 1, wherein said second bearer comprises a plurality of second machine-type communication service types.

8. The method as claimed in claim 1, wherein the discarded at least one packet of the first machine-type communication service type comprises an audio codec packet discarded due to exceeding the predetermined time.

9. The method as claimed in claim 8, wherein the first narrowband is a dedicated narrowband configured to be used with only services of at least one of the first machine-type communication service type or the second narrowband is a shared narrowband configured to be used with all machine-type communication service types.

10. The method as claimed in claim 1, comprising receiving reconfiguration information providing a command to delete the first bearer for the first machine-type communication service type.

11. An apparatus comprising:
at least one processor; and
at least one non-transitory memory including computer program code, where the at least one non-transitory memory and the computer program code are configured, with the at least one processor, to cause the apparatus to at least:
transmit, to an apparatus of a communication network, configuration information for a first bearer for a first machine-type communication service type and a second bearer for at least one second machine-type communication service type of a plurality of machine-type communication service types;
wherein each of the plurality of machine-type communication service types is associated with a priority level of at least one priority level from the communication network,
wherein the at least one priority level is based on an identified at least one of a narrowband occupancy by a machine-type communication service type, a maximum number of machine-type communication bearers, or a blockage of non-guaranteed bit rate traffic by a machine-type communication service type, and
wherein a second machine-type communication service type is associated with a priority level that is promoted higher than a non-guaranteed bearer of the first machine-type communication service type, said first machine-type communication service type comprising a voice over internet protocol service,
wherein based on the first machine-type communication service type and the second machine-type communication service type occupying a same narrowband, and a duration of the higher priority of the second machine-type communication service type exceeding a predetermined time, discarding at least one packet of the first machine-type communication service type; and
communicate with the apparatus with the voice over internet protocol service based on the priority level using said first bearer for said first machine-type communication service type and the second bearer for said at least one second machine-type communication service type.

12. The apparatus as claimed in claim 11, wherein the at least one non-transitory memory including the computer program code is configured with the at least one processor to cause the apparatus to:
determine a metric of a signal quality for communications with the apparatus;
compare the metric to a threshold value, wherein the threshold value is determined dynamically;
determine the configuration information in dependence on the comparison.

13. The apparatus as claimed in claim 11, wherein the configuration comprises scheduling of the non-guaranteed bearer is delayed until after the first bearer is setup.

14. The apparatus as claimed in claim 11, wherein the at least one non-transitory memory including the computer program code is configured with the at least one processor to cause the apparatus to:
determine a metric of a signal quality for communications with the apparatus; and
use the metric to determine a number of repetitions a channel transmitted to the apparatus is to have.

15. The apparatus as claimed in claim 12, wherein the at least one non-transitory memory including the computer program code is configured with the at least one processor to cause the apparatus to:
receive an indication of the signal quality from the apparatus; and
determine the metric from the indication.

16. The apparatus as claimed in claim 11, wherein said second bearer comprises a plurality of second machine-type communication service types.

17. The apparatus as claimed in claim 11, wherein a first narrowband supports at least one of the first bearer or a second narrowband supports the second bearer.

18. The apparatus as claimed in claim 11, wherein the first narrowband is a dedicated narrowband configured to be used with only services of at least one of the first machine-type communication service type or second narrowband is a shared narrowband configured to be used with all machine-type communication service types.

19. An apparatus comprising:
at least one processor; and
at least one non-transitory memory including computer program code, where the at least one non-transitory memory and the computer program code are configured, with the at least one processor, to cause the apparatus to perform:
receiving, by the apparatus in a communication network, configuration information for a first bearer for a first machine-type communication service type and a second bearer for at least one second machine-type communication service type of a plurality of machine-type communication service types;
wherein each of the plurality of machine-type communication service types is associated with a priority level of at least one priority level from the communication network,
wherein the at least one priority level is based on an identified at least one of a narrowband occupancy by a machine-type communication service type, a maximum number of machine-type communication bearers, or a blockage of non-guaranteed bit rate traffic by a machine-type communication service type,
wherein said first machine-type communication service type is comprising a voice over internet protocol service,
wherein a second machine-type communication service type is associated with a priority level that is promoted higher than a non-guaranteed bearer of the first machine-type communication service type, said first machine-type communication service type comprising a voice over internet protocol service, and wherein based on the first machine-type communication service type and the second machine-type communication service type occupying a same narrowband, and a duration of the higher priority of the second machine-type communication service type exceeding a predetermined time, discarding at least one packet of the first machine-type communication service type; and communicating with a base station with the voice over internet protocol service based on the priority level using said first bearer for said first machine-type communication service type and the second bearer for said at least one second machine-type communication service type.

* * * * *